United States Patent
Chammings et al.

(10) Patent No.: US 7,781,734 B2
(45) Date of Patent: Aug. 24, 2010

(54) ELECTRONIC SENSOR WITH INTEGRATED THERMAL REGULATION

(75) Inventors: Gilles Chammings, Grenoble (FR); Bertrand Dupont, Grenoble (FR); Michael Tchagaspanian, St Ismier (FR); Jean-Luc Martin, St Geoire en Valdaine (FR)

(73) Assignee: Commissariat a l'Energie Atomique, Paris (FR)

( * ) Notice: Subject to any disclaimer, the term of this patent is extended or adjusted under 35 U.S.C. 154(b) by 157 days.

(21) Appl. No.: 12/165,888

(22) Filed: Jul. 1, 2008

(65) Prior Publication Data

US 2009/0014652 A1      Jan. 15, 2009

(30) Foreign Application Priority Data

Jul. 13, 2007    (FR) .................................. 07 56483

(51) Int. Cl.
*H01L 25/00* (2006.01)
(52) U.S. Cl. ........................................ 250/330; 250/332
(58) Field of Classification Search ................. 250/330, 250/332
See application file for complete search history.

(56) References Cited

U.S. PATENT DOCUMENTS 5,994,699 A * 11/1999 Akagawa ..................... 250/332
6,249,002 B1 * 6/2001 Butler ....................... 250/338.4
6,515,285 B1 * 2/2003 Marshall et al. .............. 250/352
2003/0230733 A1 * 12/2003 Tanaka ........................ 250/553

OTHER PUBLICATIONS

F. Simoens, et al., "New IRCMOS architecture applied to uncooled microbolometers developed at LETI", Proc. of SPIE, vol. 6542, May 14, 2007, pp. 65421T-1 to 65421T-6, XP-002471078.

M. Tchagaspanian, et al., "Design of ADC in 25 μm pixels pitch dedicated for IRFPA image proccessing at LETI", Proc of SPIE, vol. 6542, May 14, 2007, pp. 65421W-1 to 65421W-12,XP-002471079.

* cited by examiner

*Primary Examiner*—David P Porta
*Assistant Examiner*—Marcus H Taningco
(74) *Attorney, Agent, or Firm*—Oblon, Spivak, McClelland, Maier & Neustadt, L.L.P.

(57) ABSTRACT

A thermal image sensor comprising at least: one pixel matrix, wherein each pixel comprises at least one bolometer and means of applying a voltage to the terminals of the bolometer, and a comparator connecting an output of the pixel matrix to an input of the means of applying the voltage to the terminals of the bolometer of each pixel, wherein said comparator is capable of making a comparison between the output signal of the pixel matrix and a reference value, wherein the value of the voltage at the terminals of the bolometer of each pixel is determined at least partially depending on the result of the comparison.

16 Claims, 5 Drawing Sheets

ELECTRONIC SENSOR WITH INTEGRATED THERMAL REGULATION

TECHNICAL FIELD AND PRIOR ART

This document relates to the field of electronic sensors, and more particularly that of thermal image sensors such as bolometer sensors, used for example in the field of infrared imaging.

Bolometers have resistances which vary according to the temperature measured. Consequently, by imposing a fixed voltage at the terminals of a bolometer, the variations of the temperature measured by the bolometer influence the value of its resistance, and therefore the value of the current passing through it.

This temperature essentially comes from the ambient temperature. The energy contribution from an incident infrared flow that is to be measured also creates an increase in temperature, but in lower proportions than the ambient temperature: whereas the resistance value of the bolometer drops by around 1.6% for a scene temperature increase (that from the incident infrared flow that is to be measured) of 50 K, the value of this resistance is halved when the ambient temperature changes for example from 300 K to 325 K.

Until now, to overcome this problem, the sensor was laced in a casing comprising a thermal regulation system, for example of the Peltier module type, in order to maintain a constant ambient temperature. However such a thermal regulation system creates significant problems in terms of size and cost.

DESCRIPTION OF THE INVENTION

Thus there is a need to propose a thermal image sensor that does not require the use of an additional thermal regulation system such as a Peltier module, to free the sensor from the ambient temperature changes.

For this purpose, one embodiment proposes a thermal image sensor comprising at least:
- a pixel matrix, wherein each pixel comprises at least one bolometer and means of applying a voltage to the terminals of the bolometer, and
- a comparator, or comparison means, connecting an output of the pixel matrix to an input of the means of applying the voltage to the terminals of the bolometer of each pixel, wherein said comparator is capable of making a comparison between the output signal of the pixel matrix and a reference value, wherein the value of the voltage at the terminals of the bolometer of each pixel is determined at least partially by the result of the comparison.

Consequently, the effects of the ambient temperature on the sensor are regulated electronically, which may for example use the capacity of the MOS injection transistor gates associated to the bolometers in the pixel matrix.

By controlling the voltage applied to the terminals of the bolometers, this voltage is common to all of the bolometers of the sensor, for example by means of the voltage applied to the gates of the MOS injection transistors, the value of the polarisation current circulating in these bolometers is imposed. Consequently, the average current passing through the bolometers corresponds to the desired reference value. Therefore it is possible to centre the output signal, either analogue or digital, of the pixel matrix, in the middle of the desired output dynamic, by modifying an input signal (gate voltage) which directly influences the magnitude (polarization current) that is subsequently converted, providing the output signal of the pixel matrix.

This closed loop may be used with a sensor providing an analogue or digital output signal by using a suitable comparator.

By reference value, in this case and in the rest of the document, it is meant a predetermined value or range of values between two limit values.

The pixel matrix may comprise means capable of supplying a signal to the output of the pixel matrix. The signal supplied by these means may be obtained from a measurement by the bolometer of each pixel.

The pixel matrix may comprise means of multiplexing, or a multiplexor of, signals obtained from bolometer measurements of the pixels, wherein the multiplexed signals may then be supplied to the output of the pixel matrix.

The means of applying a voltage to the terminals of the bolometer of each pixel may comprise a MOS transistor, the input of these means may be connected to the gate of the MOS transistor.

The pixel matrix may comprise at least means capable of supplying the bolometer with a current that varies with the ambient temperature, wherein these means may comprise at least one compensating bolometer.

The pixel matrix may comprise at least means capable of compensating part of the current supplied by the bolometer from each pixel, wherein these means may comprise at least one compensating bolometer.

The pixel matrix may comprise at least means for converting, or a converter of, a measurement of the bolometer of each pixel into a signal comprising a series of pulses, means for counting, or a counter of, the pulses and means of memorising, or a memory of, the pulse counting result.

In this case, the conversion means, or converter, may comprise at least one integrating capacitor connected to an input of the conversion means, or converter, and to a first input of a comparator, wherein a second input of the comparator may be connected to a voltage generator.

The pixel matrix may then in this case supply a digital signal.

The pixel matrix may comprise at least one current-voltage amplifier designed to receive in input at least one bolometer measurement of one of the pixels, wherein the output of said current-voltage amplifier may be connected to at least one input of a blocking sampler.

In this case, the pixel matrix may supply an analogue signal.

The comparison means, or comparator, may comprise at least:
- a first input capable of receiving the output signal from the pixel matrix,
- a second input capable of receiving the reference value,
- means capable of supplying to the output of the comparison means an output current i of which the value |i| may vary according to the polarisation voltage to be applied to the comparison means and for which the sign may be determined depending on the result of the comparison between the output signal of the pixel matrix and the reference value, wherein the value of the voltage at the terminals of the bolometer varies according to the output current i supplied by the comparison means, or comparator.

In this case, the means capable of supplying to the output of the comparison means, or comparator, the output current i may at least include:

a current mirror formed by two transistors PMOS, a first NMOS transistor whose gate may be connected to the second input, a second NMOS transistor whose gate may be connected to the first input, a third NMOS transistor connected to the first and second NMOS transistors, the polarisation voltage may be applied to the gate of the third NMOS.

The comparison means, or comparator, may at least comprise:

a first input capable of receiving the output signal from the pixel matrix, means capable of supplying to the output of the comparison means an output current i of which the value |i| may vary according to a polarisation voltage obtained from the comparison means, or comparator, and for which the sign may be determined by the result of the comparison between the output signal of the pixel matrix and the reference value, the value of the voltage at the terminals of the bolometer varies with the output current i supplied by the comparison means, or comparator.

In this case, the means capable of supplying to the output of the comparison means, or comparator, the output current i may at least include:

a first current mirror formed by two transistors PMOS, a second current mirror formed by two NMOS transistors, a third NMOS transistor whose gate may be connected to the first input and for which the source and the drain may be respectively connected to the source and drain of one of the two NMOS transistors of the second current mirror, a third PMOS transistor whose gate may be connected to the first input and for which the source and the drain may be respectively connected to the source and drain of one of the two PMOS transistors of the second current mirror, a resistor connected between the third NMOS transistor and the third PMOS, wherein the polarisation voltage may be the voltage obtained at the terminals of this resistor.

When the output signal of the pixel matrix is digital, one or several high order bits of the output signal may be intended to be applied to one or several terminals of the first input of the comparison means, or comparator.

The comparison means, or comparator, may comprise a plurality of MOS transistors, wherein the value of the polarisation voltage may at least partially depend on the channel width and length of the MOS transistors.

The comparison means, or comparator, may further comprise at least one resistor, wherein the value of the polarisation voltage may at least partially depend on the value of the resistor.

This invention also relates to a method for measuring a temperature with a thermal image sensor, at least including the following steps:

the generation of a signal that is representative of the temperature measured, the comparison of the value of the signal to a reference value, the correction of the value of the signal depending on the result of the comparison.

The generation of the signal that is representative of the temperature measured may be obtained by applying the following steps:

the generation of a first signal for which the magnitude value depends on the value of the temperature measured, the conversion of the first signal into a second pulse signal for which the number of pulses depends on the magnitude value of the first signal, the counting of the number of pulses of the second signal, wherein the signal that is representative of the temperature measured may comprise the number of pulses counted.

The signal value may be corrected depending on the result of the comparison by modifying the magnitude value of the first signal.

The signal that is representative of the temperature measured may be a digital signal, wherein the measurement method may be used for a time $\tau = n \times T_{frame}$, where n: number of quantification levels of the signal that is representative of the temperature measured, and $T_{frame}$: time to capture an image by the sensor.

BRIEF DESCRIPTION OF THE DRAWINGS

This invention will be more clearly understood upon reading the description of embodiments provided purely by way of example and in no way restrictively, in reference to the appended drawings in which.

Identical, similar or equivalent parts of the various figures described below have the same numerical references so as to facilitate the passage from one figure to another.

The various parts shown in the figures are not necessarily shown to a uniform scale, in order to make the figures easier to read.

The various possibilities (variants and embodiments) are to be understood as not being mutually exclusive and may be combined with one another.

DETAILED DESCRIPTION OF SPECIFIC EMBODIMENTS

Figure 1:
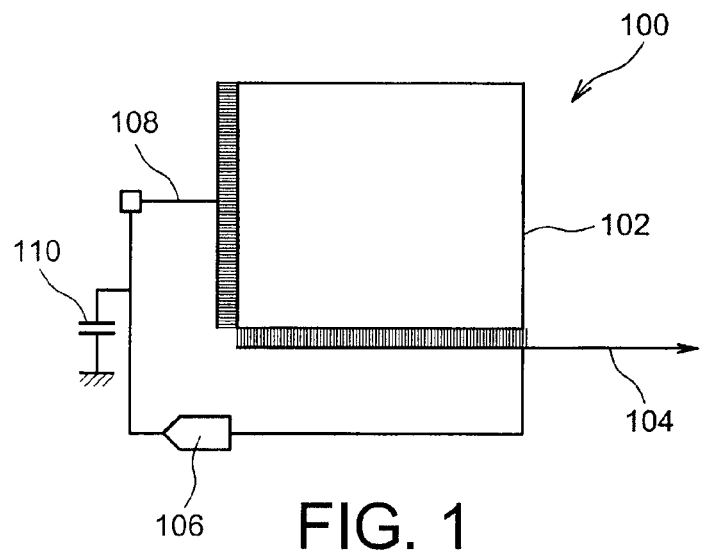
FIG. 1 shows a thermal image sensor according to one specific embodiment.

Reference is made firstly to FIG. 1 which shows a sensor 100 according to one specific embodiment.

The sensor 100 comprises a pixel matrix 102 comprising for example 76800 pixels distributed in 240 lines and 320 columns. An output 104 of the pixel matrix 102 forms the output of the sensor 100. The output 104 of the matrix 102 is connected to the input of the comparison means 106, or comparator 106. Finally, the output of the comparator 106 is connected to an input 108 of the pixel matrix 102.

In the specific embodiment described in relation to FIG. 1, a capacitor 110 may also be connected to the input 108 of the pixel matrix 102, in parallel to the connection between the output of the comparator 106 and the input 108 to increase the value of the servo or return loop time constant as will be explained below in this description.

The image captured by the pixel matrix 102 is supplied in the form of a digital or analogue signal to the output 104. The comparator 106 makes the comparison between the value of the output signal representing the captured image, supplied by the pixel matrix 102, and the value of a reference value corresponding for example to the average value that the output of the pixel matrix 102 is designed to tend towards. In one variant, this reference value may be a range of values between two limit values, wherein the average value of the signal supplied to the output of the pixel matrix is intended to be included.

The result of this comparison is then sent to the input 108 of the pixel matrix 102. A closed loop is then made between the output 104 and the input 108 of the pixel matrix 102 via the comparator 106, thus permitting the average value of the output signal of the pixel matrix 102 to be tended towards a desired value or a range of desired values.

Figure 2A:
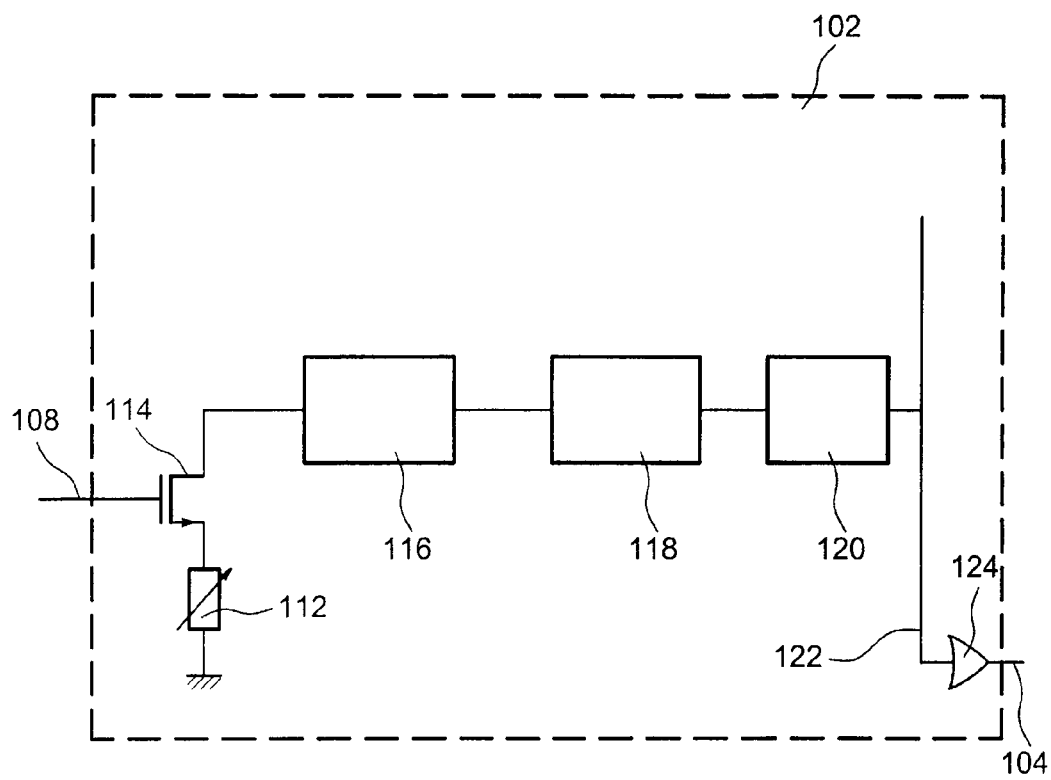
FIG. 2A shows part of a pixel matrix used in a sensor according to a first variant of embodiment.

Part of the pixel matrix 102, in the case of a digital image capture, is shown diagrammatically in FIG. 2A. In this FIG. 2A, a single bolometer 112, forming the capture part of a pixel of the matrix 102, is shown. The pixel matrix 102 here comprises as many bolometers as pixels. The bolometer 112 is connected to the source of a NMOS injection transistor 114. The input 108 of the matrix 102 is connected to the gate of the NMOS transistor 114. The drain of the NMOS transistor 114 is connected to conversion means, or a converter, 116 transforming the value of the voltage applied to the input into a signal comprising a series of pulses. The output of the converter 116 is connected to counting means, or a counter, 118, which is itself connected to memorising means 120, or a memory. The converter 116, the counter 118 and the memorising means 120 form a circuit for reading the bolometer 112.

The output of the memorising means 120 is connected to a bus 122, common to all the memorising means of a same column of pixels, or a same line of pixels, of the matrix 102. The bus 122, as well as all of the other buses of the matrix 102 of the other columns or lines of pixels, is connected to a multiplexer 124 which multiplexes the signals of all the buses of the matrix 102 and whose output forms the output of the pixel matrix 102. When the signal supplied to the output of the multiplexer 124 is an analogue signal, it is possible to connect the output of the multiplexer 124 to an analogue—digital converter, which is not shown. Similarly, when the signal supplied to the output of the multiplexer 124 is a digital signal, it is possible to connect the output of the multiplexer 124 to a digital—analogue converter, which is not shown either. This converter may be part of the pixel matrix 102 or be located outside of this matrix.

The reading circuit of the bolometer 112 converts the current circulating in the bolometer 112 into a signal comprising a series of pulses, wherein the frequency of the pulses depends on the value of the current circulating in the bolometer 112. The pulses are then counted during a counting time that corresponds to a capture or measurement time by the bolometer 112. The number of pulses counted is then supplied to the output of the reading circuit, wherein this number is representative of the current passing through the bolometer 112, which is to say of the measurement made by the bolometer 112.

Figure 2B:
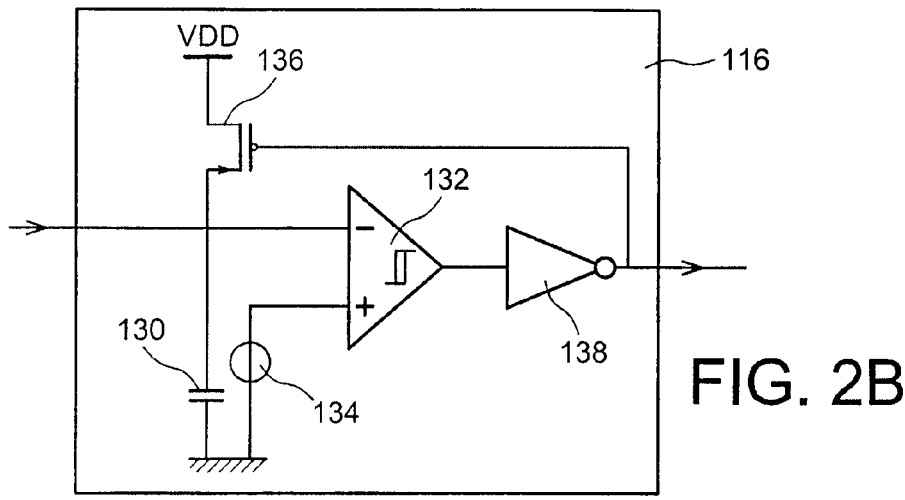
FIG. 2B shows an example of a voltage to pulse signal converter.

One example of an embodiment of the converter 116 is shown in FIG. 2B. The converter 116 comprises an integrating capacitor 130 connected to the input of the converter 116 and to an inverting input of a comparator 132. A non-inverting input of the comparator 132 is connected to a voltage generator 134. A "recharge" PMOS transistor 136 is placed between the non-inverting input of the comparator 132 and the supply voltage $V_{DD}$. The PMOS transistor 136 and the capacitor 130 are thus placed in series between the earth and the supply voltage $V_{DD}$. An inverter 138 is connected between the output of the comparator 132 and the output of the converter 116.

The operation of the pixel matrix 102 will now be described in detail. A polarisation voltage $V_g$, corresponding to the signal obtained at the output of the comparator 106, is applied to the input 108 of the matrix 102, which is to say to the gate of the NMOS injection transistor 114. As the voltage $V_g$ is constant during the measurement time of the bolometer 112, the voltage at the terminals of the bolometer 112 is also constant.

Consequently, when the temperature varies, the resistance of the bolometer 112 changes, which implies, given the constant voltage at the terminals of the bolometer 112, a variation in the current passing through it. For example, for a variation of the scene temperature of 50 K, the current circulating in the bolometer 112 varies by around 2 nA. This current is taken from the integrating capacitor 130, thus causing a drop in the voltage at the terminals of this capacitor 130. The voltage generator 134 applies a reference voltage $V_{ref}$, for example equal to 2 V to the non-inverting input of the comparator 132.

Prior to the capture, or measurement, of the bolometer 112, the capacitor 130 is "pre-charged" to the supply voltage $V_{DD}$ by means of a PMOS pre-charge transistor, that is not shown, connected to the supply voltage $V_{DD}$. When the capture starts, the voltage at the terminals of the capacitor 130 is substantially equal to the supply voltage $V_{DD}$, the it drops progressively during the capture. When the potential applied to the inverting input of the comparator 132, which is to say the voltage at the terminals of the capacitor 130, reaches $V_{ref}$, the comparator 132 switches and the PMOS transistor 136 allows current to pass, permitting the recharge of the capacitor 130. The comparator 132 is for example a hysteresis comparator so that the capacitor 130 may be completely recharged, substantially to $V_{DD}$, before it switches to the opposite direction after a certain length of time. During this first cycle, thanks to the discharge and recharge of the capacitor 130, a pulse is generated at the output of the comparator 132.

The counter 118 increments with each pulse received. Consequently, the number of pulses generated at the output of the converter 116 that are counted by the counter 118 during a determined capture period or counting period, is representative of the variation of the resistance of the bolometer 112, and therefore of the variation in temperature induced by the radiation measured by the bolometer 112. The memorising means 120 allow the number of pulses counted by the counter 118 to be memorised at the end of the capture period.

The counter 118 may for example be an asynchronous logic counter and may be made using toggles D, thus providing a digital signal, or an analogue counter comprising a capacitor whose capacity permits the total number of pulses of the signal to be counted, wherein each pulse involves the storage of a certain number of charges in the capacitor. The signal supplied to the output 104 of the matrix 102 is then sent to the input of the comparator 106.

Figure 3A:
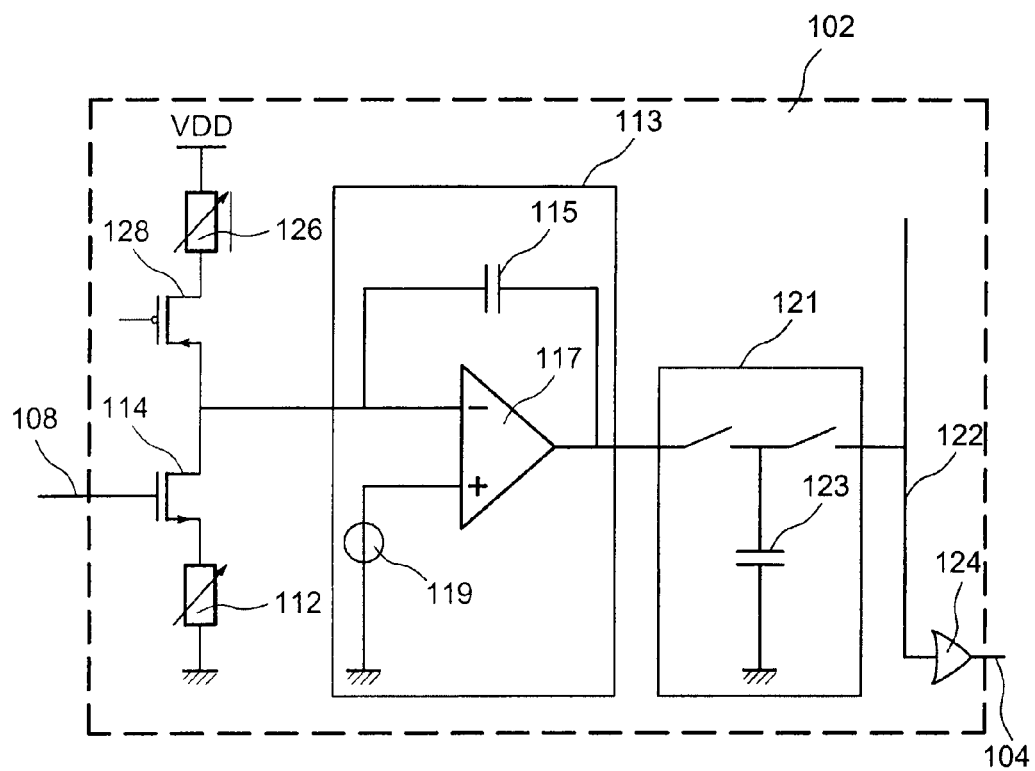
FIGS. 3A and 3B show part of a pixel matrix used in a sensor respectively according to a second and a third variant of embodiment.

FIG. 3A shows diagrammatically an analogue variant of an embodiment of part of the pixel matrix 102. In this FIG. 3A, a single bolometer 112, forming the sensor part of a pixel of the matrix 102, is shown, as well as the reading circuit of this bolometer 112.

As in the example of a digital embodiment shown in FIG. 2A, the bolometer 112 is voltage controlled by the NMOS transistor 114. In this example of embodiment, the matrix 102 comprises a compensating bolometer 126 at the top of the column, which is to say common to all of the bolometers in a same column of pixels. This compensating bolometer 126 is positioned between a supply voltage $V_{DD}$, for example equal to 3.3 V, and the drain of the NMOS transistor 114. The compensating bolometer 126 is connected to a PMOS transistor 128 whose gate is connected to an external potential adjusted to compensate the current passing through the bolometer 112, which is to say to provide a current that is inverted to that passing through the bolometer 112, and thus obtain at the drain of the NMOS transistor 114 a current that is the difference between the current circulating in the bolometer 112 and that circulating in the compensating bolometer 126, thus corresponding to the scene temperature measured.

The compensating bolometer 126 may be thermalised, which is to say that it is insensitive to the scene temperature but only at the temperature of the substrate on which it is made in order to allow the at least partial compensation of the temperature fluctuations of the substrate, or cropped, which is to say that it includes a thermal screen which renders it insensitive to the variations in scene temperature.

Due to the dispersions of the circuit (especially the resistance of the bolometer 112, the threshold voltage of the NMOS injection transistor 114 and an integrating capacitor 115), the current circulating in the bolometer 112 varies for example between 140 nA and 160 nA. Whereas, the variation of the current corresponding to a variation in scene temperature of 50 K is around 2 nA. The compensating bolometer 126 thus permits a large part of the common mode to be compensated, for example equal to 140 nA, and thus to obtain the current corresponding to the scene temperature and the current related to the technological dispersions.

In one variant of embodiment, the compensating bolometer 126 may be replaced by a simple bolometer, for example similar to the cropped bolometer 112. The bolometer 112 and the compensating bolometer 126 thus are both subject to the same drift due to the variations in temperature, apart from the variations due to the scene temperature.

The compensated current, corresponding to the difference between the current circulating in the bolometer 112 and the current circulating in the compensating bolometer 126, is sent to the input of a current-voltage amplifier 113 and is integrated by the integrating capacitor 115 connecting an inverting input of the operational amplifier 117 to its output, wherein a voltage generator 119 is connected to a non-inverting input of the operational amplifier 117.

The voltage obtained at the output of the current-voltage amplifier 113 is sent to the input of a blocking sampler 121 comprising a capacitor 123 permitting the value of this voltage to be stored. The output of the blocking sampler 121 is connected to the bus 122 and the multiplexer 124, as in the example of a digital embodiment of FIG. 2A, thus multiplexing the signals of all the buses of the matrix 102, wherein the output of the multiplexer 124 forms the output 104 of the pixel matrix 102.

Figure 3B:
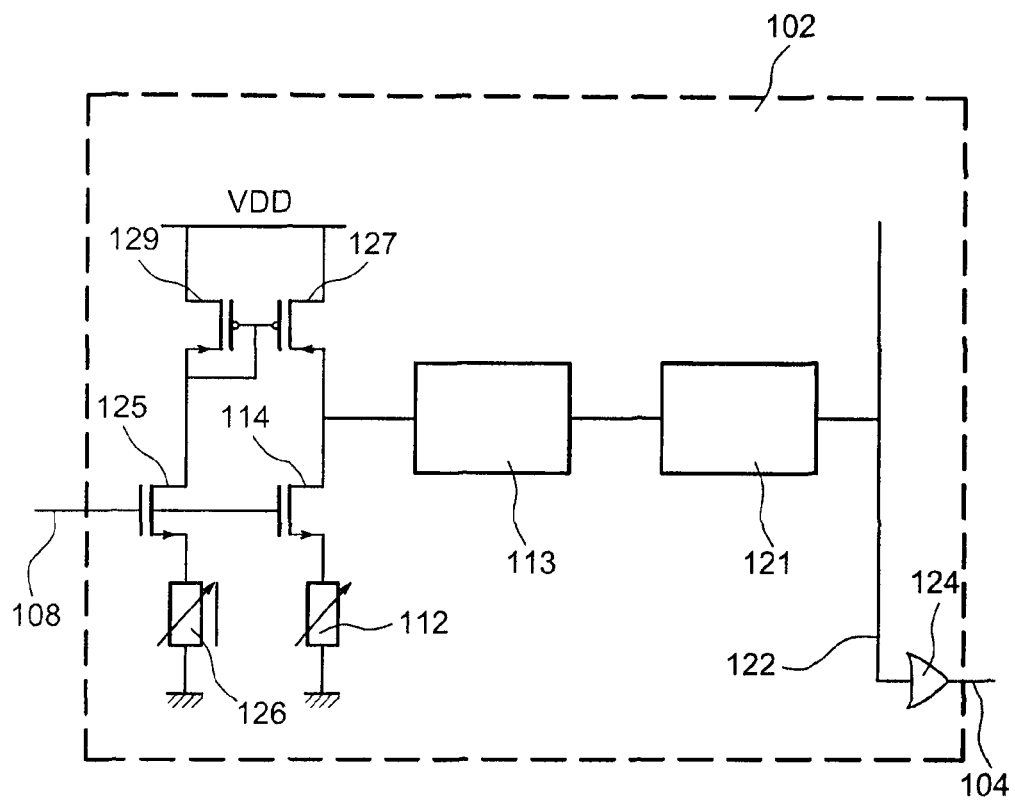

Another variant of an analogue embodiment of this part of the pixel matrix 102 is shown diagrammatically in FIG. 3B. With respect to FIG. 3A, the PMOS transistor 128 is replaced by a NMOS transistor 125 whose gate is connected to that of the NMOS injection transistor 114. The drains of the NMOS transistors 114 and 125 are connected to two PMOS transistors 127 and 129 forming a current mirror. Consequently, the current circulating in the arm formed by the NMOS transistor 125 and the compensating bolometer 126 is reproduced in the arm formed by the bolometer 112 and the NMOS transistor 114.

Figure 4:
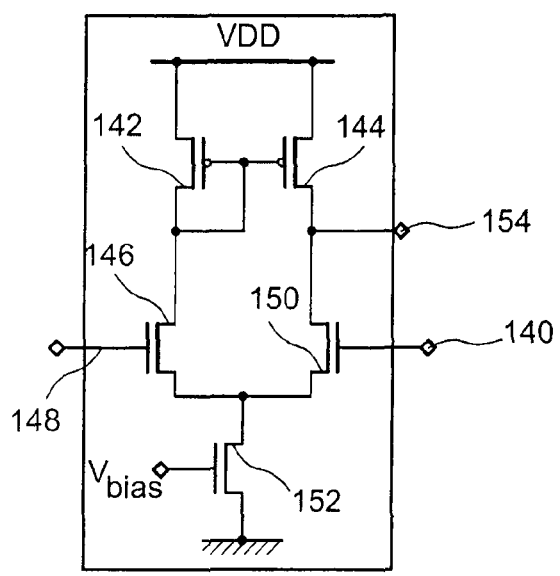
FIG. 4 shows a first example of a comparator used in a sensor.

FIG. 4 shows a first example of an embodiment of a comparator 106 that may be used when the signal supplied to the output of the pixel matrix 102 is in analogue or digital form. This comparator 106 comprises a first input 140 to which the output signal of the pixel matrix 102 is applied. A current mirror is formed by two PMOS transistors 142 and 144. The comparator 106 also comprises a first NMOS transistor 146 whose gate is connected to a second input 148 to which the desired reference value is applied. The comparator 106 comprises a second NMOS transistor 150 whose gate is connected to the first input 140. Finally, a third NMOS transistor 152 is connected to the first and second NMOS transistors 146 and 150.

A polarisation voltage $V_{bias}$ is applied to the gate of this third NMOS 152. The value of this polarisation voltage $V_{bias}$ is chosen to suit a desired polarisation current $I_{bias}$, designed to pass through the comparator 106. This polarisation current $I_{bias}$ is constant and equal to the sum of the current passing through the first arm formed by the transistors 142 and 146 and the current passing through the second arm formed by the transistors 144 and 150. Finally, an output 154 of the comparator 106 is connected to the input 108 of the pixel matrix 102, which is to say to the gate of the NMOS injection transistor 114 (and more generally to the gates of all the NMOS injection transistors of the matrix 102), supplying a current i.

Consequently, when the reference value applied to the second input 148 is compared to the input signal applied to the first input 140 of the comparator 106, if the input signal is higher than the reference value (for example equal to $V_{DD}/2$), there is a current of value $i=-I_{bias}$ which passes through the NMOS transistors 150 and 152 taken from the capacity formed by the gates of the NMOS injection transistors 114. When the sensor 100 includes the capacitor 110 shown in FIG. 1, the current $I_{bias}$ is also taken from this capacitor 110. A nil current passes through the transistors 142, 144 and 146. Inversely, if the reference value is higher than the value of the input signal, then a current of value $I_{bias}$ passes through the PMOS transistors 142 and 144 and the NMOS transistors 146 and 152. Whereas, given, that the NMOS transistor 150 does not let the current pass, then a current of value $i=I_{bias}$ charges the capacities formed by the gates of the MOS injection transistors and possibly the capacitor 110.

Therefore at the output 154 of the comparator 106 there is a current whose value is equal to $+I_{bias}$ or to $-I_{bias}$ depending on the result of the comparison made between the reference value and the signal supplied by the pixel matrix 102.

This comparison of the output of each of the pixels with the reference voltage, or reference value, $V_{bias}$, allows a code to be generated. This code indicates that the pixel processed has an output value that is either greater or smaller than the desired reference value. This comparison thus permits current to be either injected or withdrawn from the gates of the injection transistors, thus varying the potential at the terminals of the capacity formed by the gates of the MOS injection transistors 114 through which this current passes and possibly at the terminals of the capacitor 110. The potential obtained at the terminals of these capacities corresponds to the potential $V_g$ applied to the gates of the MOS injection transistors 114.

Figure 5:
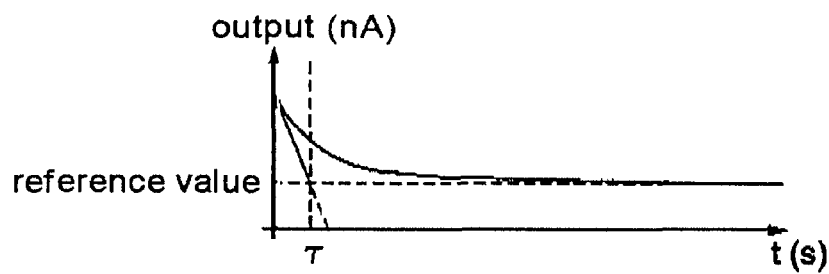
FIG. 5 shows the average value of an analogue signal obtained at the output of a sensor comprising the comparator shown in FIG. 4.

FIG. 5 shows the average value of an analogue output signal of the sensor 100. In this figure, the value measured at the start of the capture by all of the pixels is greater than the reference value. It may be observed that the more images the sensor measures, the closer the average value obtained at the output is to the reference value. In infrared, the top (sky) and the bottom (earth) of an image do not have the same temperature, which is characterised by different digital codes. It is thus possible to obtain a return loop time constant τ, which is to say the time during which the sensor will make the measurements by returning them to the closed loop to correct the measurement, which is much more important than the frame time $T_{frame}$, which is to say the capture time of an image. In FIG. 5, it may be observed that the time constant τ corresponds to the time where the straight line y=reference value and the tangent to the origin of the output curve intersect. For example, the return loop time constant may be equal to τ=20 s, the time during which 1000 images may be captured by the sensor 100. The upper limit of this time constant τ may be provided by the thermal time constant of the casing or the camera in which the sensor 100 is located.

Adding the capacitor 110 permits a global adaptation and provides a time constant τ that is greater than when simply the capacity of the gates of the MOS injection transistors 114 forms a capacity between the pixel matrix 102 and the comparator 106.

Figure 6:
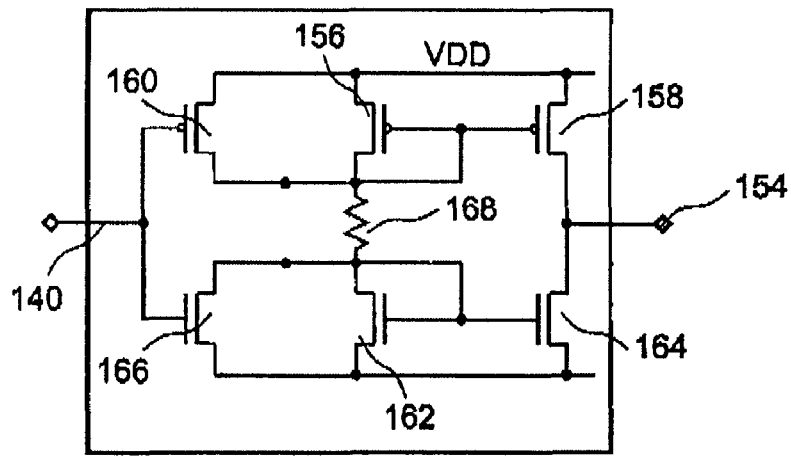
FIG. 6 shows a second example of a comparator used in a sensor.

FIG. 6 shows a second example of an embodiment of a comparator 106 that may be used when the signal supplied at the output of the pixel matrix 102 is in digital form. This comparator 106 comprises a current mirror formed by two PMOS transistors 156 and 158. It also comprises a third PMOS transistor 160 connected in parallel to the PMOS 156, and whose gate is connected to the input 140 of the comparator 106. The comparator 106 also comprises two NMOS transistors 162 and 164 also mounted in current mirror, and a third NMOS transistor 166 connected in parallel to the NMOS transistor 162, and whose gate is connected to the input 140.

In this second example of embodiment, only the highest order bit of the digital signal supplied to the output 104 of the pixel matrix 102 is taken into account by the comparator 106. A resistor 168 is connected between the drain of the PMOS transistor 156 and the drain of the NMOS transistor 162. In this variant of comparator 106, the reference value is not applied to an input of the comparator 106, but arises partially from the chosen value of the resistor 168. Given that the value of the voltage at the terminals of the resistor 168 is constant, the value of the resistor 168 is chosen to suit the desired value of the polarisation current $I_{bias}$ passing through this resistor 168. The transistors 156 and 162 are also dimensioned so that their width W to channel length L ratio is equal to N times the W/L ratio of the transistors 158 and 164. This therefore provides $I_{bias}=N\times i$, where i is the current that is charged to or taken from the capacity formed by the gates of the MOS injection transistors 114 connected to the output 154 and possibly the capacitor 110. It may be observed that the comparator 106 shown in this FIG. 6 forms a digital-analogue converter.

Depending on the value of the highest order bit of the signal supplied to the input 140, the PMOS transistor 160 or the NMOS transistor 166 allows current to pass, which in one case charges the capacity of the gates of the MOS injection transistors 114 with a current of value i passing through the resistor 146, and in the other case, takes from the capacity of the gates of the MOS injection transistors 114 a current of value i.

Figure 7:
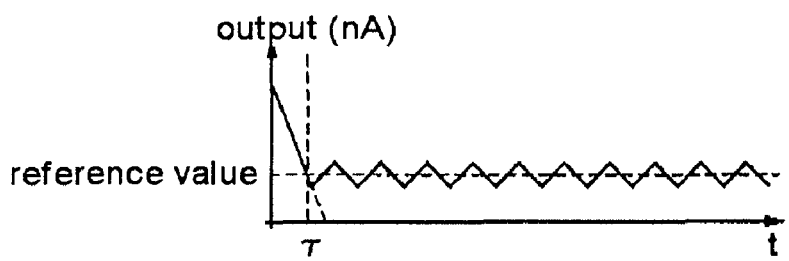
FIG. 7 shows the average value of a digital signal obtained at the output of a sensor comprising the comparator shown in FIG. 5.

FIG. 7 shows the average value of the signal obtained at the output when the sensor 100 supplies a digital signal. In this figure, the value measured at the start of the capture by all of the pixels is greater than the reference value. It may be observed after a certain number of measurements, that the value of the signal oscillates around the reference value. Once again, the measurements may be made during a time corresponding to the time constant τ, for example equal to 20 s. Such an output signal may also be obtained by using a pixel matrix supplying to the output an analogue signal that is sent to a analogue-digital converter such as a binary comparator.

Depending on the desired resolution and scene excursion, the useful information is quantified on n levels (n=number of bits of the output signal). In order that the effects of the time constant do not exceed a quantification level, a time constant is chosen $\tau=n\times T_{frame}$, where $T_{frame}$: capture time of an image.

Closing the loop of the first order stops influencing the gate voltage of the MOS injection transistors when the reference value is reached: henceforth, the code generated in the case of an analogue output signal or directly the high order bit(s) of the output flow in the case of a digital signal will be equiprobable (will have as many 1 and 0 as for the digital signal).

Figure 8:
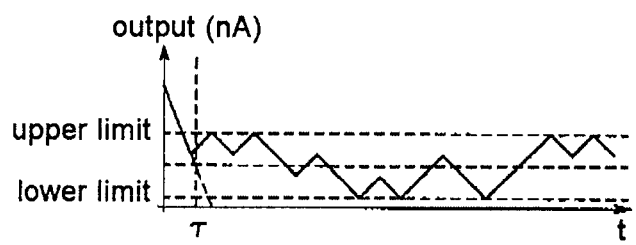
FIG. 8 shows the average value of a digital signal obtained at the output of a sensor comprising a comparator which makes a comparison of two high order bits of the digital signal.

Several high order bits (highest order bit and one or several subsequent high order bits) may also be used to impose an upper and lower limit beyond which the system intervenes to regulate the average value of the output signal of the sensor. FIG. 8 shows the average value of the output signal of the sensor 100 in such a case. In this figure, it may be observed that when the signal is between these two limits and it reaches either one of these two limits, it is sent back towards the other one of these two limits.

Figure 9:
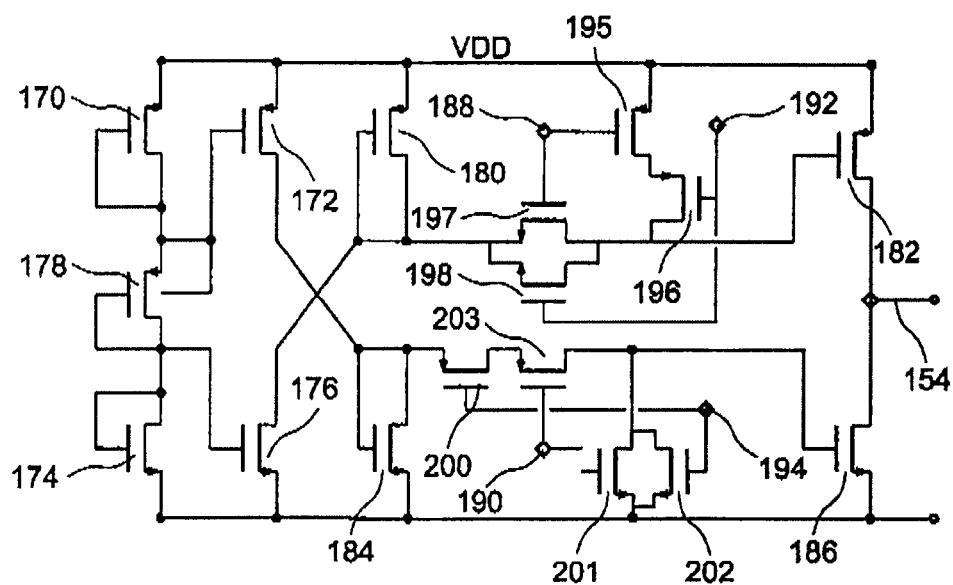
FIG. 9 shows an example of a comparator which makes a comparison of two high order bits of a digital signal that is the output of a sensor.

An example of a comparator 106 making a comparison by taking into account the two highest order bits of a digital signal entering this comparator 106 is shown in FIG. 9.

This comparator 106 has two comparative stages. The first stage comprises a first PMOS transistor 170 and a second PMOS transistor 172 mounted in current mirror. A first NMOS transistor 174 and a second NMOS transistor 176 are also mounted in current mirror. The structure formed by these four transistors is similar to that formed by the four transistors 156, 158, 162 and 164 of the comparator 106 shown in FIG. 6, wherein the resistor 168 of this comparator is in this case replaced by a third PMOS transistor 178, playing the same role as the resistor 168. As concerns this third PMOS transistor 178, the ratio of its width W to its channel length L is chosen according to the desired value of the polarisation current $I_{bias}$ passing through this transistor 178, which is to say the desired injection of current or withdrawal of charges. As in the comparator 106 of FIG. 6, the two transistors 170 and 174 are dimensioned so that their width W to channel length L ratio is equal to N times the W/L ratio of the transistors 172 and 176.

The second stage is formed by a fourth PMOS transistor 180 and a fifth PMOS transistor 182 mounted in current mirror. A third NMOS transistor 184 and a fourth NMOS transistor 186 are also mounted in current mirror. The structure formed by these four transistors is similar to that formed by the four transistors 170 to 176. The two transistors 180 and 184 are dimensioned so that their width W to channel length L ratio is equal to N time the W/L ratio of the transistors 182 and 186. The comparator 106 supplies the result of the comparison to the output 154. This therefore provides $I_{bias}=N^2\times i$, where i is the current that is charged to or taken from the capacity formed by the gates of the MOS injection transistors 114 connected to the output 154 and possibly the capacitor 110.

For example, the first highest order bit of the signal to be compared is applied to two input terminals 188 and 190. The second high order bit is for example applied to two other input terminals 192 and 194. Four MOS transistors 195 to 198 form a NO OR logic gate between the two inputs 188 and 192, which is to say between the two high order bits. Four other MOS transistors 200 to 203 form a NO AND logic gate between the two inputs 190 and 194, which is to say between the two high order bits. Consequently, charges are added to the capacity formed by the gates of the MOS injection transistors 114 connected to the output 154 and possibly the capacitor 110 when the two high order bits are 0 and charges are withdrawn when the two high order bits are 1, which permits the output signal to remain between the upper and lower limits determined.

In comparison to the comparator shown in FIG. 6, the double stage structure of this comparator 106 permits equalisation errors of the current mirrors between the NMOS transistors and PMOS used in the comparator to be corrected.

The invention claimed is:

1. A thermal image sensor comprising at least:
   one pixel matrix, wherein each pixel comprises at least one bolometer and means of applying a voltage to the terminals of the bolometer, and
   a comparator connecting an output of the pixel matrix to an input of the means of applying the voltage to the terminals of the bolometer of each pixel, wherein said comparator is capable of making a comparison between the output signal of the pixel matrix and a reference value, wherein the value of the voltage at the terminals of the bolometer of each pixel is determined at least partially depending on the result of the comparison.

2. The sensor according to claim 1, wherein the means of applying the voltage to the terminals of the bolometer of each pixel comprise a MOS transistor, and the input of these means being connected to the gate of the MOS transistor.

3. The sensor according to claim 1, wherein the pixel matrix comprises at least means capable of compensating part of a current supplied by the bolometer of each pixel.

4. The sensor according to claim 3, wherein the means capable of compensating part of the current supplied by the bolometer of each pixel comprise at least one compensating bolometer.

5. The sensor according to claim 1, wherein the pixel matrix comprises at least a converter of a measurement of the bolometer of each pixel into a signal comprising a series of pulses, a counter of the pulses and a memory of the counting result of the pulses.

6. The sensor according to claim 5, wherein the converter comprises at least one integrating capacitor connected to an input of the converter and to a first input of a comparator, wherein a second input of the comparator is connected to a voltage generator.

7. The sensor according to claim 1, wherein the pixel matrix comprises at least one current-voltage amplifier designed to receive an input of at least one measurement of a bolometer of one of the pixels, wherein the output of said current-voltage amplifier is connected to at least one input of a blocking sampler.

8. The sensor according to claim 1, wherein the comparator comprises at least:
   a first input capable of receiving the output signal from the pixel matrix,
   a second input capable of receiving the reference value,
   means capable of supplying to the output of the comparator an output current i whose the value |i| depends on a polarisation voltage designed to be applied to the comparator and whose sign is determined by the result of the comparison between the output signal of the pixel matrix and the reference value,
   wherein the value of the voltage at the terminals of the bolometer depends on the output current i supplied by the comparator.

9. The sensor according to claim 1, wherein the comparator comprises at least:
   a first input capable of receiving the output signal from the pixel matrix,
   means capable of supplying to the output of the comparison means an output current i whose value |i| depends on a polarisation voltage obtained from the comparator and whose sign is determined by the result of the comparison between the output signal of the pixel matrix and the reference value,
   wherein the value of the voltage at the terminals of the bolometer depends on the output current i supplied by the comparator.

10. The sensor according to claim 9, wherein, when the output signal of the pixel matrix is digital, one or several high order bits of the output signal is/are designed to be applied to one or several terminals of the first input of the comparator.

11. The sensor according to claim 9, wherein the comparator comprises a plurality of MOS transistors, the value of the polarisation voltage depending at least partially on the width and the channel length of the MOS transistors.

12. The sensor according to claim 9, wherein the comparator further comprise at least one resistor, the value of the polarisation voltage depending at least partially on the value of the resistor.

13. A method for measuring a temperature with a thermal image sensor, comprising at least the following steps:
   the generation of a signal that is representative of the temperature measured,
   the comparison of the value of the signal to a reference value,
   the correction of the value of the signal according to the result of the comparison.

14. The method according to claim 13, wherein the generation of the signal that is representative of the temperature measured is obtained by applying the following steps:
   the generation of a first signal for which the magnitude value depends on the value of the temperature measured,
   the conversion of the first signal into a second pulse signal for which the number of pulses depends on the magnitude value of the first signal,
   the counting of the number of pulses of the second signal, wherein the signal that is representative of the temperature measured comprises the number of pulses counted.

15. The method according to claim 14, wherein the value of the signal is corrected according to the result of the comparison by modifying the value of the magnitude of the first signal.

16. The method according to claim 13, wherein the signal that is representative of the temperature measured is a digital signal, wherein the measurement method is used for a time $\tau = n \times T_{frame}$, where n: number of quantification levels of the signal that is representative of the temperature measured, and $T_{frame}$: time to capture an image by the sensor.

* * * * *